(12) United States Patent
Campbell, Jr. et al.

(10) Patent No.: US 7,683,003 B2
(45) Date of Patent: Mar. 23, 2010

(54) METHOD FOR IDENTIFYING ZIEGLER-NATTA COCATALYSTS

(75) Inventors: Richard E. Campbell, Jr., Midland, MI (US); Sylvie Desjardins, Lake Jackson, TX (US); Phillip D. Hustad, Manvel, TX (US); Duane R. Romer, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 11/596,335

(22) PCT Filed: May 13, 2005

(86) PCT No.: PCT/US2005/016793

§ 371 (c)(1),
(2), (4) Date: Nov. 9, 2006

(87) PCT Pub. No.: WO2006/043985

PCT Pub. Date: Apr. 27, 2006

(65) Prior Publication Data

US 2007/0276102 A1 Nov. 29, 2007

Related U.S. Application Data

(60) Provisional application No. 60/580,308, filed on Jun. 16, 2004.

(51) Int. Cl.
C08F 4/64 (2006.01)
C08F 4/642 (2006.01)
C08F 4/646 (2006.01)

(52) U.S. Cl. ............ 502/104; 502/115; 502/132; 502/134; 526/124.2; 526/124.4; 526/124.7; 526/124.8

(58) Field of Classification Search .......... 502/104, 502/115, 132, 134; 526/124.2, 124.4, 124.7, 526/124.8
See application file for complete search history.

(56) References Cited

U.S. PATENT DOCUMENTS

| | | | |
|---|---|---|---|
| 4,377,720 A | 3/1983 | Langer | |
| 4,442,276 A | 4/1984 | Kashiwa et al. | |
| 4,460,701 A | 7/1984 | Terano et al. | |
| 4,540,679 A | 9/1985 | Arzoumanidis et al. | |
| 4,547,476 A | 10/1985 | Terano et al. | |
| 4,634,687 A | 1/1987 | Fujita et al. | |
| 4,816,433 A | 3/1989 | Terano et al. | |
| 4,829,037 A | 5/1989 | Terano et al. | |
| 4,927,797 A | 5/1990 | Ewen | |
| 4,990,479 A | 2/1991 | Ishimaru et al. | |
| 5,028,671 A | 7/1991 | Kioka et al. | |
| 5,034,361 A | 7/1991 | Job et al. | |
| 5,066,737 A | 11/1991 | Job | |
| 5,066,738 A | 11/1991 | Ewen | |
| 5,077,357 A | 12/1991 | Job | |
| 5,082,907 A | 1/1992 | Job | |
| 5,106,806 A | 4/1992 | Job | |
| 5,146,028 A | 9/1992 | Job | |
| 5,151,399 A | 9/1992 | Job | |
| 5,153,158 A | 10/1992 | Kioka et al. | |
| 5,229,342 A | 7/1993 | Job | |
| 5,247,031 A | 9/1993 | Kioka et al. | |
| 5,247,032 A | 9/1993 | Kioka et al. | |
| 5,468,707 A | 11/1995 | Pohl et al. | |
| 5,487,938 A | 1/1996 | Spencer et al. | |
| 5,519,098 A | 5/1996 | Brown et al. | |
| 5,712,171 A | 1/1998 | Zambias et al. | |
| 5,776,359 A | 7/1998 | Schultz et al. | |
| 5,844,045 A | 12/1998 | Kolthammer et al. | |
| 5,985,356 A | 11/1999 | Schultz et al. | |
| 6,004,617 A | 12/1999 | Schultz et al. | |
| 6,030,917 A | 2/2000 | Weinberg et al. | |
| 6,045,671 A | 4/2000 | Wu et al. | |
| 6,248,540 B1 | 6/2001 | Weinberg et al. | |
| 6,326,090 B1 | 12/2001 | Schultz et al. | |
| 6,346,290 B1 | 2/2002 | Schultz et al. | |
| 6,534,606 B2 | 3/2003 | Kohler et al. | |
| 6,627,571 B1 | 9/2003 | Lugmair et al. | |

(Continued)

FOREIGN PATENT DOCUMENTS

EP 0 164 789 12/1985

(Continued)

OTHER PUBLICATIONS

Senkan, Selim M., High-throughput Screening of Solid-State Catalyst Libraries, Nature, 1998, pp. 350-353, vol. 394, Macmillan Publishers Ltd.

(Continued)

*Primary Examiner*—Caixia Lu

(57) ABSTRACT

A method for identifying a catalyst composition for use in the heterogeneous Ziegler-Natta addition polymerization of an olefin monomer, said catalyst composition comprising a procatalyst comprising a magnesium and titanium containing procatalyst and a cocatalyst said method comprising: a) providing a library comprising at least one procatalyst compound, b) forming a catalyst composition library by contacting the member of said procatalyst library with one or more cocatalysts and contacting the resulting mixture with an olefin monomer under olefin polymerization conditions thereby causing the polymerization reaction to take place, c) measuring at least one variable of interest during the polymerization, and d) selecting the catalyst composition of interest by reference to said measured variable.

10 Claims, No Drawings

U.S. PATENT DOCUMENTS

2006/0122340 A1* 6/2006 Rohde et al. ................. 526/65

FOREIGN PATENT DOCUMENTS

| EP | 0 978 499 | 11/2001 |
|----|-----------|---------|
| EP | 1 321 479 | 9/2004 |
| GB | 799823 | 8/1958 |
| WO | WO-98/15805 | 4/1998 |
| WO | WO-98/15815 | 4/1998 |
| WO | WO-00/40331 | 7/2000 |
| WO | WO-2006/007093 | 1/2006 |

OTHER PUBLICATIONS

Burgess, Kevin, et al., New Catalysts and Conditions for a C-H Insertion Reaction Identified by High Throughput Catalyst Screening, Angewandte Chemie International Edition in English, 1996, pp. 220-222, vol. 35 No. 2.

Maier, Wilhelm F., et al., Detection of Catalytic Activity in Combinatorial Libraries of Heterogeneous Catalysts by IR Thermography, Angewandte Chemie International Edition, 1998, pp. 2644-2647, vol. 37 No. 19.

Reetz, Manfred T., et al., Time Resolved IR-Thermographic Detection and Screening of Enantioselectivity in Catalytic Reactions, Angewandte Chemie International Edition, 1998, pp. 2647-2650, vol. 37 No. 19.

Schlogly, Robert, Combinatorial Chemistry in Heterogeneous Catalysis: A New Scientific Approach or "the King's New Clothes"?, Angewandte Chemie International Edition, 1998, pp. 2333-2336, vol. 37 No. 17.

Morken, James P., et al., Thermographic Selection of Effective Catalysts from an Encoded Polymer-Bound Library, Sciene, 1998, pp. 267-270, vol. 280.

Gilbertson, Scott R., et al., The Combinatorial Synthesis of Chiral Phosphine Ligands, Tetrahedron Letters, 1996, pp. 6475-6478, vol. 37 No. 36.

Eisenhardt, Andrea, et al., Donor Atom-Stabilized Aluminum Alkyls as Cocatalysts for the Ziegler-Natta Polymerization of Propene, Advanced Synthesis and Catalysis, 2003, pp. 1299-1304, vol. 345.

Schumann, Herbert, et al., Oxygen-Stabilized Organoaluminum Compounds as Highly Active Cocatalysts for Ziegler-Natta Olefin Polymerization, Organometallics, 2003, pp. 1391-1401, vol. 22.

Peil, Kevin P., et al., Applications of High Throughput Research at The Dow Chemical Company, Macromolecular: Rapid Communications, 2004, pp. 119-126, vol. 25.

International Search Report (PCT/US2005/016793).

* cited by examiner

METHOD FOR IDENTIFYING ZIEGLER-NATTA COCATALYSTS

CROSS REFERENCE STATEMENT

This application claims the benefit of U.S. Provisional Application No. 60/580,308, filed Jun. 16, 2004.

BACKGROUND

The present invention relates to the field of research for new cocatalyst compositions especially for use in Ziegler-Natta addition polymerization processes. More particularly, this invention is directed toward an apparatus and method of performing heterogeneous Ziegler-Natta catalyzed polymerization of olefins and related techniques for rapidly creating and testing libraries of cocatalyst compositions prepared by combinatorial techniques.

Combinatorial (also known as high throughput or parallel) chemistry and materials science techniques have been used to rapidly screen large numbers of compounds for use in biological, organic, inorganic, and organometallic synthesis and research. Combinatorial materials science generally refers to the methods for creating a collection of chemically diverse compounds or materials and to methods for rapidly testing or screening this library of compounds or materials for desirable performance characteristics and properties. Areas for application of such combinatorial methods have included the discovery of compounds for use as biologically active materials as well as high-temperature superconductors, magnetoresistive materials, luminescent compounds, and catalysts. Examples include U.S. Pat. Nos. 5,712,171, 5,776,359, 5,985,356, 6,004,617, 6,045,671, 6,326,090, 6,346,290, 6,627,571 and WO 00/40331.

In addition to the foregoing patent references, numerous academic papers have also disclosed combinatorial techniques, including: Senkan, *Nature*, vol. 394, pp. 350-353 (Jul. 23, 1998); Burgess et al., *Angew. Chem. Int. Ed. Eng.*, 1996, 35, No. 2, pp. 220-222; Maier et al., *Angew. Chem. Int. Ed. Eng.*, 1998, 37, No. 19, pp. 2644-2647; Reetz et al., *Angew. Chem. Int. Ed. Eng.*, 1998, 37, No. 19, pp. 2647-2650; *Angew. Chem. Int. Ed. Eng.*, 1998, 37, No. 17, pp. 2333-2336; Morken et al., *Science*, vol. 280, pp. 267-270 (Apr. 10, 1998); and Gilbertson et al., *Tetrahedron Letters*, vol. 37, no. 36, pp. 6475-6478 (1996).

Although the foregoing and other references have advanced the art of combinatorial materials testing, still further improvements and advances in the field of Ziegler-Natta catalyst development are desired. In particular, rapid techniques of screening candidate materials that are useful as cocatalyst compositions are desired.

Generally, Ziegler-Natta catalyst compositions comprise a Group 2 metal containing procatalyst composition, especially a $MgCl_2$ supported transition metal complex, and a cocatalyst or activator. Suitable activators generally are trihydrocarbylaluminum compounds, especially trialkyl aluminum compounds such as triethylaluminum.

In WO 00/40331 a combinatorial apparatus and method for evaluating homogeneous and supported homogeneous coordination polymerization catalysts including olefin polymerization catalysts employing a metal compound formed from a metal of Groups 3-15 of the Periodic Table of the Elements and one or more ligands is disclosed.

In U.S. Pat. No. 6,627,571, a method for screening heterogeneous catalysts comprising applying a suspension of a catalyst carrier to multiple regions of a substrate and removing liquid there from to form an array of porous catalyst carriers, impregnating the array with a catalytically active component or precursor thereof and analyzing for activity was disclosed.

Ziegler-Natta catalysts can be produced by numerous techniques including physical blending of solid mixtures of magnesium halides with titanium halides or the in situ formation of precipitated halogenated solids from liquid mixtures. Solid phase forming techniques involve the use of ball-mills or other suitable grinding and comminuting equipment and are not adaptable to combinatorial research approaches. Precipitation techniques use repeated halogenations with various halogenating agents, preferably $TiCl_4$ to prepare suitable procatalyst compositions. Other aspects of Ziegler-Natta catalysis present significant challenges to the use of combinatorial approaches in automation and reactor design, particularly due to the small size of the reaction vessels employed and the need to handle a plurality of samples. Consequently, the application of combinatorial methods to Ziegler-Natta process research has not been adequately explored.

In *Adv. Synth. Catal.*, 2003, 345, 1299-1304, the use of donor stabilized aluminum alkyls as activators for the polymerization of propene is disclosed. In *Organometallics* 2003, 22, 1391-1401 modified alkyl aluminum compounds are disclosed for use as Ziegler-Natta catalyst activators. U.S. Pat. No. 5,468,707 disclosed similarly modified alkylaluminum complexes with 1 or more coordination groups. GB-A-799823 disclosed the use of organoaluminum cocatalysts including halogen, alkoxy aryloxy, amido, mercaptal, thiophenoxy, carboxy, or sulfonic acid ligands. DE 2,212,088 disclosed Ziegler-Natta catalyst compositions comprising an alkylaluminum; and alkoxyaluminum or aryloxyaluminum compounds. U.S. Pat. No. 4,377,720 disclosed using a zirconium containing Ziegler-Natta catalyst in combination with an aluminum cocatalyst including dialkylaluminum alkoxides or aryloxides and dialkylaluminum disubstituted amides. EP-A-1,132,409 disclosed Ziegler-Natta catalyst compositions employing specific alkylaluminum complexes.

It would be desirable if combinatorial research techniques could be applied to heterogeneous catalysts, especially to Ziegler-Natta catalyst compositions, comprising at least one transition metal compound, optionally supported on an inert solid material, an activator or cocatalyst, and optionally one or more polymerization modifier compounds. In particular, what is needed is a combinatorial method and apparatus for the rapid and reliable discovery and development of catalyst compositions that is particularly adapted to use in addition polymerization research, especially research related to the addition polymerization of olefin monomers to form high molecular weight polymers using Ziegler-Natta catalysts.

SUMMARY OF THE INVENTION

This invention provides methods and apparatus for performing the combinatorial synthesis of libraries and screening of those combinatorial libraries particularly adapted for use in addition polymerizations employing Ziegler-Natta catalysts and to improved cocatalyst compositions for Ziegler-Natta olefin polymerizations.

The broadest concept of the methodology is that a library of catalyst compositions containing at least one procatalyst, at least one cocatalyst, and optionally one or more polymerization modifiers is created and screened for olefin polymerization activity, especially by measurement of process variables under polymerization conditions. The libraries that are created are typically formed from arrays of transition metal complexes or compounds or mixtures or multi-level arrays thereof by one or more conversion steps to form catalyst compositions. The resulting products are then screened for polymerization activity under Ziegler-Natta reaction conditions, usually by forming a mixture or solution of one or more of the foregoing catalyst compositions with one or more monomers and testing for a property of interest. This invention provides a number of embodiments for performing such synthesis and screening, and the embodiments may be combined together.

In the library, each member may have a common property or functionality, but will vary in structural diversity, molecular weight or some other variable to be tested (rational variation). Alternatively, the library may contain a mixture of diverse compounds with no unifying feature or structure (random variation). The individual members of the library are mostly different from each other in some chemically significant manner, however, for purposes of calibration, some repetition of library members may be desired. Optionally, one or more daughter libraries are created from the parent library by taking one or more aliquots from one or more members of the parent library and combining them, optionally with any additional components. For example, each daughter library may be considered to be a replica of the original library, but include one or more additional components or chemical operations. At least one precursor or procatalyst compound and at least one activator or cocatalyst should be present in at least a portion of the members of the precursor library or a daughter library to create one or more catalyst libraries, which are then subjected to addition polymerization conditions. The polymerization may be used to create a product library, that is a polymer library. Alternatively, the polymerization serves as a screen for activity. The process conditions may also be combinatorialized, such as by varying the amounts of reactants employed or by choosing different polymerization process conditions such as time, temperature, pressure, stirring rate, order of reagent addition, etc. The method optionally may provide different screening stages, such as a primary screen to eliminate some members from a library before going on to a secondary screen.

One embodiment of the present invention particularly adapted for use in Ziegler-Natta catalyst research is a method and apparatus for researching and discovering novel cocatalysts by starting with a procatalyst library that includes a plurality of member compounds, comprising at least one complex or compound of a Group 2 metal. The compounds generally will differ by composition, by structure, or by both composition and structure. Examples include compounds such as alkoxides, halides or carboxylates of a Group 2 metal, or Lewis base containing derivatives thereof, or mixtures of the foregoing compounds or complexes. If desired, the library may also begin with precursors to the foregoing procatalysts and incorporate an additional level of synthesis in preparing a daughter library comprising the desired procatalyst compositions.

The library (precursor library or procatalyst library) is subjected to one or more conversion processes that may involve one or more steps or repetitions of steps involving one or more reagents or catalyst modifiers in order to form a catalyst composition to be screened. Examples of such conversion processes include halogenation, titanation or other chemical conversion of the procatalyst, addition of one or more solvents, mixing, heating, cooling, filtering, extracting, or simply aging. In addition, additives, such as internal electron donors, external electron donors, or other catalyst modifiers may be added for purposes of imparting desired properties, such as polymer selectivity to the resulting catalyst. Separate libraries of such additives may also be employed in combination with the library of procatalyst compounds (or precursor compounds) in order to evaluate and screen various combinations of precursors, procatalysts, cocatalysts and additives.

In addition to the foregoing, the present invention employs a cocatalyst to convert the procatalyst into an active polymerization catalysts under reaction conditions. Accordingly, the present process allows for synthesis and testing or candidate cocatalysts under typical Ziegler/Natta polymerization conditions and the rapid discovery of suitable cocatalysts. In a unique procedure, the cocatalyst may be formed by reaction of two or more reagents immediately prior to use in the polymerization process, if desired. Alternatively, the cocatalyst maybe previously synthesized and isolated or purified prior to use.

The foregoing manipulations require the use of a cell or other suitable reaction vessel capable of allowing measured addition of reagents, adequate mixing and manipulation of the resulting reaction mixtures, heating and or cooling of the reactor contents, separations of products, and removal of by-products, solvents, or other constituents. Desirably, each reaction cell or vessel is sealed and subjected to an inert atmosphere or otherwise isolated from other reaction cells and from the library or libraries in order to prevent loss of volatile reactor components or contamination of other reagents, reactors, or reaction mixtures. Highly desirably, each reactor or cell is equipped with or has access to a filtration means that allows for ready separation of liquids from any solid reactor contents in the cell.

DETAILED DESCRIPTION

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art. Unless stated to the contrary, implicit from the context, or customary in the art, all parts and percents are based on weight.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

A "library" as used in this invention has either chemical diversity or process diversity. Chemical diversity refers to a library having members that vary with respect to atoms or their arrangement in molecules or compounds. Process diversity refers to a library having members that may have begun with the same compounds, but experienced different processing conditions and are different as a result of those different processing conditions. Different processing conditions include varying the ratios of compounds and reagents, time of reaction, reaction temperature, reaction pressure, rate of starting component addition to the reaction, residence time (or product removal rate), reaction atmosphere, mixing rate, or other conditions that those of skill in the art will recognize. It is through the creation of libraries having diversity and the screening of such libraries for a property or compound of interest that a complete combinatorial research and development program may be undertaken for olefin polymerization reactions.

As used herein a "station" is a location in the apparatus that performs one or more functions. The functions may be combining the starting components, creating a product library via a reaction, screening, purifying, separating, or performing any of the other functions discussed above. Thus, the station may comprise a liquid or solid handling robot with pumps and computers (as known in the art) to dispense, dissolve, mix and/or move liquids or solids from one container to another. The station may comprise any of the reactors discussed herein, and may be remotely located from the remainder of the apparatus, such as in an inert atmosphere glove box, if desired. A station may also perform multiple functions, optionally separated by cleaning, reconditioning or resetting if desired.

Catalyst Formation

As mentioned above, the olefin polymerization procatalyst precursors employed in the invention comprise a Group 2 metal compound, preferably derivatives of magnesium. Sources for such magnesium moieties include magnesium metal, anhydrous magnesium chloride, magnesium alkoxides or aryloxides, or carboxylated magnesium alkoxides or aryloxides. Preferred sources of magnesium moieties are magnesium ($C_{1-4}$)alkoxides, especially magnesium compounds or complexes containing at least one ethoxy group. Additionally, the precursors desirably comprise a transition metal compound, especially titanium compounds. Suitable sources of titanium moieties include titanium alkoxides, titanium aryloxides, and/or titanium halides. Preferred precursors comprise one or more magnesium ($C_{1-4}$)alkoxide or halide containing compounds and optionally one or more titanium ($C_{1-4}$)alkoxides or halides.

Various methods of making procatalyst precursor compounds are known in the art. These methods are described, inter alia, in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, 5,487,938, and elsewhere. In a preferred method, the preparation involves chlorination of a magnesium compound or mixture of compounds, optionally in the presence of an inert solid support material, especially silica, alumina, an aluminosilicate, or similar substance. Additional techniques such as ball milling of solid magnesium chloride mixtures is known as well.

A preferred procatalyst precursor for use herein is a mixed magnesium/titanium compound of the formula $Mg_dTi(OR^e)_eX_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently R', chlorine, bromine or iodine; d is 0.5 to 5, preferably 2-4, most preferably 3; e is 2-12, preferably 6-10, most preferably 8; and f is 1-10, preferably 1-3, most preferably 2. The precursors are ideally prepared by controlled precipitation through removal of an alcohol from the reaction mixture used in their preparation. An especially desirable reaction medium comprises a mixture of an aromatic liquid, especially a chlorinated aromatic compound, most especially chlorobenzene, an alkanol, especially ethanol, and an inorganic chlorinating agent. Suitable inorganic chlorinating agents include chlorine derivatives of silicon, aluminum and titanium, especially titanium tetrachloride or aluminum sequichloride, most especially titanium tetrachloride. Removal of the alkanol from the solution used in the chlorination, results in precipitation of the solid precursor, having especially desirable morphology and surface area. Moreover, the resulting precursors are particularly uniform particle sized and resistant to particle crumbling as well as degradation of the resulting procatalyst.

The precursor is converted to a solid procatalyst by halogenation with a halogenating agent, especially an inorganic halide compound, preferably a titanium halide compound. For propylene or higher alkene polymerization catalysts where controlled tacticity is desired, the process is conducted in the presence of an internal electron donor. If not already incorporated into the precursor in sufficient quantity, the electron donor may be added separately before, during, or after halogenation. Any method of making, recovering and storing the solid precursor is suitable for use in the present invention.

One suitable method for converting the solid procatalyst precursor into a polymerization procatalyst is by reacting the precursor with a tetravalent titanium halide, an optional hydrocarbon or halohydrocarbon, and an electron donor (if not already present). The preferred tetravalent titanium halide is titanium tetrachloride.

The optional hydrocarbon or halohydrocarbon employed in the production of olefin polymerization procatalyst preferably contains up to 12 carbon atoms inclusive, more preferably up to 9 carbon atoms inclusive. Exemplary hydrocarbons include pentane, octane, benzene, toluene, xylene, and alkylbenzenes. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. Of the aliphatic halohydrocarbons, compounds containing at least two chloride substituents are preferred, with carbon tetrachloride and 1,1,2-trichloroethane being most preferred. Of the aromatic halohydrocarbons, chlorobenzene is particularly preferred.

Suitable electron donors are those electron donors free from active hydrogens that are conventionally employed in the formation of magnesium-based procatalysts. Particularly preferred electron donors include (poly)ethers, (poly)esters, amines, imines, nitriles, phosphines, stibines, arsines, and compounds that can be converted into esters in-situ during the synthesis of the procatalysts, such as phthalic anhydrides, succinic anhydrides, glutaric anhydrides, and phthaloyl chlorides. The more preferred electron donors, however are carboxylic acid esters or ether derivatives thereof, particularly $C_{1-4}$ alkyl esters of aromatic monocarboxylic or dicarboxylic acids and $C_{1-4}$ alkyl ether derivatives thereof. Examples of such electron donors are methylbenzoate, ethylbenzoate, isopropylbenzoate, isobutylbenzoate, ethyl p-ethoxybenzoate, ethyl-p-methoxybenzoate, isopropyl-p-ethoxybenzoate, isobutyl-p-ethoxybenzoate, diethylphthalate, dimethylnaphthalenedicarboxylate, diisopropylphthalate, diisobutylphthalate, di-n-propylphthalate, di-n-butylphthalate, 1,2-diethoxybenzene, 1-ethoxy-2-n-propoxybenzene, 1-ethoxy-2-n-butoxybenzene, and 1-ethoxy-2-n-pentoxybenzene. The electron donor can be a single compound or a mixture of compounds. Particularly preferred internal electron donors are: ethylbenzoate, ethyl p-ethoxybenzoate, di(n-butyl)phthalate, di(isobutyl)phthalate, and 1-ethoxy-2-n-pentoxybenzene.

In one embodiment of the invention, the electron donor may be formed in situ, by contacting the procatalyst precursor with an organic halogenating agent, especially benzoyl chloride or phthalyl dichloride, simultaneously with the foregoing precursor forming step or halogenation step using an inorganic halide compound. Sufficient electron donor usually is provided or prepared in situ, so that the molar ratio of electron donor to the magnesium present in the solid procatalyst at this stage of the preparation is from 0.01:1 to 3:1, preferably from 0.05:1 to 2:1.

The manner in which the procatalyst precursor, the optional hydrocarbon or halohydrocarbon, the electron donor, and the halogenating agent are contacted may be varied within wide limits. In one embodiment, the tetravalent titanium halide is added to a mixture of the electron donor and procatalyst precursor. More preferably however, the procatalyst precursor first is mixed with the tetravalent titanium halide and optional halohydrocarbon, and the electron donor is added last, after a period lasting from 1 to 30 minutes of precontact between the precursor and halogenating agent. Ideally, the contact time and temperature are controlled in order to obtain a solid product having a desired particle morphology. Preferred contacting times of the precursor with the remaining ingredients in the procatalyst composition forming process are at least 10, preferably at least 15 and more preferably at least 20 minutes, up to 10 hours, preferably up to 2 hours, most preferably up to 1 hour, at a temperature from at least −70, preferably at least 25, most preferably at least 60° C., to a temperature up to 160, preferably up to 140, most preferably up to 130° C. At combinations of higher temperatures or longer contacting times, particle morphology, especially particle size, size distribution and porosity of the resulting solid, procatalyst composition and the catalysts formed therefrom is adversely affected.

Preferred members of the procatalyst library for use herein are mixed magnesium/titanium compounds of the formula: $Mg_{d'}Ti(OR^e)_{e'}X_{f'}(ED)_{g'}$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently R', chlorine, bromine or iodine; ED independently each occurrence is an electron donor, especially an aromatic monocarboxylic acid ester or an aromatic dicarboxylic acid diester; d' is 1 to 36, preferably 6-18, most preferably 10-14; e' is 0-3, preferably 0.01-2, most preferably 0.01-1; f' is 20-40, preferably 25-35, most preferably 27-29; and g' is 0.1-3, preferably 0.5-2.5, most preferably 1-2.

Catalyst precursors for use in polymerization of ethylene alone or mixtures of ethylene and an α-olefin, especially 1-butene, 1-hexene, or 1-octene desirably comprise one or more Group 2 metal compounds, especially hydrocarbyl magnesium alkoxides, such as butyloctylmagnesium ethoxide (BOMAG-O available from Schering A.G.) or buytylethylmagnesium butoxide (BEMB available from Texas Alkyls Inc.) or similar compound. A solid support, especially high surface area, dehydroxylated silica, optionally treated with a Lewis acid, especially methylalumoxane, trimethylaluminum or triethylaluminum, may be combined with the Group 2 metal compound, generally in the form of a slurry in a hydrocarbon liquid, if desired. Alternatively, a solid support, if desired, may be combined with the procatalyst or the catalyst at any stage of the reaction. Normally an internal electron donor is not present in procatalyst compositions used to polymerize ethylene and a $C_{4-8}$ α-olefin.

If necessary the procatalyst may be formed by a metathesis or exchange reaction of the Group 2 metal containing precursor composition with a halogenating agent, preferably a chlorinating agent in order to convert residual alkoxide moieties in the precursor to chloride moieties. Titanium tetrachloride optionally mixed or alternated with another halide compound such as $V(O)Cl_3$, $Si(O)Cl_2$ or ethylaluminum dichloride, is the preferred chlorinating reagent. The reaction medium preferably is a hydrocarbon, chlorocarbon or chlorohydrocarbon, especially one or more alkanes, or chlorobenzene. The metathesis may be repeated one more time, as desired until a suitable procatalyst composition is attained.

After the foregoing exchange procedure, the resulting procatalyst composition is separated from the reaction medium employed in its preparation, preferably by filtering to produce a moist filter cake. The moist filter cake desirably is then rinsed or washed with a liquid diluent, preferably an aliphatic hydrocarbon to remove unreacted $TiCl_4$ and may be dried to remove residual liquid, if desired. Typically the solid procatalyst composition is washed one or more times with an aliphatic hydrocarbon such as pentane, isopentane, hexane, octane, isooctane, or a mixture of such hydrocarbons. The final procatalyst composition can be separated and dried or slurried in a hydrocarbon, especially an alkane or mixture of alkanes for further storage or use.

Other techniques for producing procatalysts may be employed if desired. For example, suitable procatalysts may also be prepared by reaction between a hydrocarbon dispersion of magnesium dichloride and an alkylaluminum dihalide, especially ethylaluminum dichloride, followed by reaction with a titanium alkoxide, especially a titanium tetraalkoxide, such as titanium tetraisopropoxide. The magnesium dichloride may be prepared by ball milling solid magnesium dichloride or reaction of an organomagnesium compound, especially a dialkylmagnesium compound such as diethylmagnesium with HCl in a hydrocarbon liquid.

The resulting solid procatalyst composition is desirably in the form of porous particles, optionally supported on an inert metal oxide or metalloid oxide, corresponding to the formula: $Mg_{d''}Ti(OR^e)_{e''}X_{f''}(ED)_{g''}(Ether)_{h''}$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently R', chlorine, bromine or iodine; ED is an electron donor, especially ethyl benzoate, diisobutyl phthalate, or 1-ethoxy-2-n-pentoxybenzene; Ether is an aliphatic ether, aliphatic polyether or aliphatic (poly) glycol ether; d'' is 1 to 50, preferably 6 to 30, most preferably 10 to 25; e'' is 0 to 3, preferably 0 to 1.5, most preferably 0 to 0.5; f'' is 2 to 100, preferably 5 to 80, most preferably 6 to 60; g'' is 0 to 3, preferably 0 to 2.5, most preferably 0 to 2; and h'' is 0 to 5, preferably 0.001 to 2, most preferably 0.01 to 1.

Desirably, the resulting procatalyst composition has the following particle physical properties as measured by BET, nitrogen porosimetry, and laser particle analyzer: an average surface area of at least 100 $m^2$/g, preferably at least 250 $m^2$/g, an average pore volume of at least 0.18 $cm^3$/g, preferably at least 0.20 $cm^3$/g, mean particle size from 20 to 40 μm, preferably from 24 to 30 μm, and particle size distribution having $D_{10}$ from 3 to 15 μm, $D_{50}$ from 18 to 30 μm and $D_{90}$ from 35 to 75 μm. Further desirably, the residual alkoxide content of the resulting solid, procatalyst composition is 5 weight percent or less, more preferably 3 weight percent or less, most preferably 1 weight percent or less.

The procatalyst composition may be further treated according to one or more of the following procedures, if desired. The solid procatalyst composition may be halogenated with a different halogenating agent or complex than previously employed; it may be contacted (extracted) with a solvent, especially a halohydrocarbon; it may be rinsed or washed, heat treated, or aged. The foregoing techniques are previously known in the art with respect to different procatalyst compositions. The foregoing additional procedures may be combined in any order or employed separately, or not at all.

The solid procatalyst composition may be extracted, if desired, to remove labile titanium halide species by exposure to a suitable liquid diluent, optionally at an elevated temperature, and filtering the resulting solid. As an example, the solid procatalyst, may be contacted with an halohydrocarbon at an elevated temperature, for example, a temperature of up to 150° C., for a period of time. It is particularly preferred to conduct the extraction at a temperature greater than 45° C., preferably greater than 85° C., more preferably greater than 115° C., and most preferably greater than 120° C., to a temperature up to 300° C., more preferably up to 200° C., and most preferably up to 150° C.

Best results are obtained if the solid and extractant are contacted initially at or near 25° C. and then heated to an elevated temperature. Sufficient tetravalent titanium halide may be provided to further convert any residual alkoxide moieties of the procatalyst to halide groups at the same time as the extraction. The extraction process is conducted in one or more contacting operations, each of which is conducted over a period of time ranging from a few minutes to a few hours.

Suitable extractants include aliphatic, cycloaliphatic, or aromatic hydrocarbons, halogenated derivatives thereof, and mixtures thereof. Exemplary aliphatic hydrocarbons include pentane, and octane. Exemplary cycloaliphatic hydrocarbons include cyclopentane, cyclohexane, and cyclooctane. Exemplary aromatic hydrocarbons include benzene, alkylbenzenes, and dialkylbenzenes. Exemplary halogenated derivatives of the foregoing include methylenechloride, methylene bromide, chloroform, carbon tetrachloride, 1,2-dibromoethane, 1,1,2-trichloroethane, trichlorocyclohexane, dichlorofluoromethane, tetrachlorooctane, chlorinated benzenes, brominated benzenes, and chlorinated toluenes. Particularly preferred aliphatic hydrocarbons include pentane, isopentane, octane, and isooctane. Particularly preferred aromatic hydrocarbons include benzene, toluene, and xylene. Particularly preferred halohydrocarbons include carbon tetrachloride, 1,1,2-trichloroethane, chlorinated benzenes and chlorinated toluenes. Most highly preferred extractants are aromatic hydrocarbons and halohydrocarbons, especially toluene, xylene, ethylbenzene, chlorobenzene and o-dichlorobenzene. Desirably the extractant selected has a boiling point above the temperature used in the extraction so as to avoid the use of high pressure equipment.

The resulting precursor may also be supplied in a solid form by removing any volatile diluents used in its preparation, desirably by spray-drying a liquid composition. In this manner, uniform shaped and sized particles of the precursor can be readily prepared.

Polymerization Modifiers

Numerous polymerization modifiers are known for use in Ziegler-Natta catalyst compositions to modify one or more polymer or process properties. One example is a selectivity control agent (SCA), or external electron donor, employed when the catalyst is used to polymerize $C_3$ and higher α-olefins. Typical SCAs are those conventionally employed in conjunction with titanium-based Ziegler-Natta catalysts. Illustrative of suitable selectivity control agents are those classes of electron donors employed in procatalyst compositions as described above, as well as organosilane or polyorganosilane compounds containing at least one silicon-oxygen-carbon linkage. Suitable silicon compounds include those of the formula, $R^1{}_m SiY_n X_p$, or oligomeric or polymeric derivatives thereof, wherein: $R^1$ is a hydrocarbon radical containing from 1 to 20 carbon atoms or a dihydrocarbylamino or trihydrocarbylsilyl group containing from 1 to 20 carbon atoms which may be substituted with substituent groups containing halogen, silicon, oxygen, nitrogen, phosphorus, or boron, Y is $-OR^2$ or $-OCOR^2$ wherein $R^2$ is a hydrocarbon radical containing from 1 to 20 carbon atoms, which may be substituted with substituent groups containing halogen, silicon, oxygen, nitrogen, phosphorus, or boron, X is hydrogen or halogen, m is an integer having a value of from 0 to 3, n is an integer having a value of from 1 to 4, p is an integer having a value of from 0 to 1, and preferably 0, and m+n+p=4. Highly preferably, $R^1$ in at least one occurrence is not a primary alkyl group, and the non-primary carbon thereof is attached directly to the silicon atom. Examples of $R^1$ include cyclopentyl, t-butyl, isopropyl or cyclohexyl. Examples of $R^2$ include methyl, ethyl, propyl, butyl, isopropyl, phenyl, benzyl and t-butyl. Examples of X are Cl and H. Each $R^1$ and $R^2$ may be the same or different. Silicon compounds in which two or more silicon atoms are linked to each other by a carbon, nitrogen or oxygen atom, such as, siloxanes or polysiloxanes, may also be employed, provided the requisite silicon-oxygen-carbon linkage is also present.

The preferred selectivity control agents are alkyl esters of aromatic carboxylic and dicarboxylic acids, ring alkoxy-substituted derivatives thereof, especially ethyl p-methoxybenzoate or ethyl p-ethoxybenzoate (PEEB), or siloxane compounds, such as n-propyltrimethoxysilane, cyclohexylmethyldimethoxysilane, or dicyclopentyldimethoxysilane, and mixtures thereof. In one embodiment of the invention the foregoing selectivity control agent may form at least a portion of the internal electron donor added during procatalyst production as well. In an alternate modification, the selectivity control agent is added only after formation of the procatalyst and may be added to a catalyst forming mixture or to an olefin polymerization mixture simultaneously or non-simultaneously with addition of the cocatalyst. When mixtures of SCA's are employed, they may be added sequentially to the polymerization, especially if one SCA interacts or competes unfavorably with another SCA.

The selectivity control agent preferably is provided in a quantity of from 0.01 mole to 100 moles per mole of titanium in the procatalyst. Preferred quantities of selectivity control agent are from 0.5 mole to 50 mole per mole of titanium in the procatalyst.

Additional polymerization modifiers include compounds, referred to as scavengers, that are capable of removing catalyst poisons from monomers, solvents and other reagents in the polymerization. Examples of such compounds for use in the present invention include alumoxanes and trihydrocarbyl aluminum compounds such as triethylaluminum. Activity limiting agents are another class of polymerization modifiers and are suitable employed to limit the rate of polymerization particularly at elevated temperatures thereby reducing reactor control problems. Antistatic agents may provide similar benefits through reduction of polymer agglomeration.

Cocatalyst

The procatalyst composition serves as one component of a Ziegler-Natta catalyst composition, in combination with a cocatalyst, and optionally one or more polymerization modifiers. The cocatalyst is preferably employed in a molar ratio based on titanium in the procatalyst of from 1:1 to 1000:1, but more preferably in a molar ratio of from 10:1 to 300:1.

The olefin polymerization catalyst is produced by any suitable procedure of contacting the procatalyst, cocatalyst and optional polymerization modifier(s). The method of contacting is not critical. The catalyst components or combinations thereof can be precontacted prior to polymerization to form a preactivated catalyst, and optionally stored as an additional library herein, or the components can be contacted simultaneously with contact with an olefin monomer in a suitable reactor. In one modification, the catalyst components simply are mixed in a suitable vessel and the preformed catalyst thereby produced is introduced into the polymerization reactor when initiation of polymerization is desired for purposes of catalyst screening. In an alternate modification, the catalyst components are separately introduced into the polymerization reactor and the catalyst is formed in situ. In a final embodiment, the catalyst components may be introduced into one polymerization reactor and prepolymerized with one or more olefin monomers and subsequently contacted with additional olefin monomers, which may be the same or different from the olefin monomers used in the prepolymerization. The subsequent polymerization may take place in the same or in a different polymerization reactor and may include separate addition of one or more of the catalyst components during said subsequent polymerization.

The cocatalyst compositions for use in the present invention in the most general sense comprise the reaction product of at least two reagents, especially one or more metal containing Lewis acids with one or more organic protonating reagents. It should be appreciated by one of skill in the art that the resulting product may contain a mixture of species, including equilibria between various species and dynamic, interconverting compounds. In one embodiment of the invention, the reaction mixture formed upon combining the foregoing reagents in a suitable diluent, preferably a hydrocarbon such as hexane or heptane is preferred for use, rather than the purified and/or isolated reaction product itself.

Suitable Lewis acids are compounds of the formula: $[M^4A^1_{x'}G_{y'}]_{z'}$, wherein:

$M^4$ is a metal of Groups 2-13, Ge, Sn, or Bi;

$A^1$ is independently an anionic or polyanionic ligand;

x' is a number greater than zero and less than or equal to 6;

G is a neutral Lewis base, optionally bound to $A^1$;

y' is a number from 0-4;

z' is a number from 1 to 10.

Preferably, the Lewis acids are metal compounds of the general formula: $M^4A^1_{x'}G_{y'}$, wherein $M^4$ is a metal of Groups 2-13, Ge, Sn, or Bi; $A^1$ is independently an anionic ligand; x' is an integer and is equal to the valence of $M^4$; G is a neutral Lewis base; and y' is a number from 0-4. More preferably, $M^4$ is Mg, B, Ga, Al, or Zn; $A^1$ is $C_{1-20}$ hydrocarbyl or inertly substituted hydrocarbyl, especially $C_{1-12}$ alkyl or aryl. Preferred inert substituents include halide, trimethylsilyl, haloaryl, and haloalkyl. Most highly preferably, $M^4$ is aluminum.

The protonating reagents used in the present invention to form cocatalysts include compounds of the formula: $[(H-J^1)_{z''}A^2]_{z'''}$, wherein:

$J^1$ is $NA^3$, $PA^3$, S, or O, z' is 1 or 2, $A^2$ is $C_{1-20}$ hydrocarbyl or inertly substituted hydrocarbyl, $tri(C_{1-10}hydrocarbyl)silyl$, or a polyvalent derivative thereof, $A^3$ is hydrogen, $C_{1-20}$ hydrocarbyl or inertly substituted hydrocarbyl, or a covalent bond (when $A^2$ is a divalent ligand group and z" is one); and z''' is a number from 1 to 10.

Preferred protonating reagents include compounds of the formula: $(H-J^1)_{z''}A^2$, wherein $J^1$ is $NA^3$, $PA^3$, S, or O, and z" is 1 or 2; and $A^2$ is $C_{1-20}$ hydrocarbyl or inertly substituted hydrocarbyl, $tri(C_{1-4}hydrocarbyl)silyl$, or a divalent derivative thereof, especially $C_{1-12}$ alkyl, 1,4-butylene, $tri(C_{1-4}alkyl)silyl$, or aryl, and $A^3$ is hydrogen, $C_{1-20}$ hydrocarbyl or inertly substituted hydrocarbyl, or a covalent bond. Preferred inert substituents are halide, trimethylsilyl, haloaryl, or haloalkyl.

Especially desired cocatalysts for use according to the present invention are the reaction products of $tri(C_{1-20}$ alkyl) hydroxysilanes, fluorinated aromatic alcohols, or inertly substituted derivatives thereof, especially fluorinated phenols, with trihydrocarbylaluminum compounds, especially $tri(C_{2-20}$ alkyl)aluminum compounds, most especially $tri(C_{4-8}$ n-alkyl)aluminum compounds. Highly desirably, the cocatalysts are the corresponding siloxydialkylaluminum derivatives, aryloxydialkylaluminum derivatives or mixtures thereof. The skilled artisan will appreciate that the actual reaction mixture comprises an equilibrium of possible products, of which the foregoing comprise one component.

By using a cocatalyst according to the present invention, one or more process or product properties is beneficially affected. Examples include the ability to prepare copolymers of ethylene and one or more comonomers, especially 1-butene, 1-hexene, 1-octene or styrene, having higher comonomer incorporation at equivalent polymerization conditions or alternatively, preparing equivalent copolymers at higher polymerization temperatures or lower comonomer concentrations in the reaction mixture. Another beneficial feature of the use of the present cocatalysts may be greater selectivity in product formation as determined by increased molecular weight (Mw), narrower molecular weight distribution (Mw/Mn) of homopolymer and copolymer products, or a relative lack of formation or reduction in formation of a particular species, such as a polymer fraction having differentiated crystallinity, solubility, tacticity, melting point, melt flow index, or other physical property. A further desirable result of the use of the present cocatalysts may be improved process properties such as greater activity or improved monomer conversion efficiency. In another embodiment, suitable cocatalyst materials may be evaluated based on performance under non-standard reaction conditions. For example, due to specific reactants or impurities in a reagent or monomer source, polymerization efficiency may be adversely affected by the use of previously known cocatalysts. Examples include the use of comonomer, especially 1-octene, prepared by gasification (reaction of an $H_2/H_2O$ mixture) with coal, peat, cellulose, or other carbon source and fractionation of the resulting mixture.

In another embodiment of the invention, a mixture of cocatalysts can be employed to obtain a mixture of polymer properties or to maximize the benefits of individual catalyst compositions. For example, quantities of standard cocatalysts, especially trialkylaluminum compounds may be employed as a secondary catalyst in combination with the cocatalysts of the present invention to obtain a broader molecular weight distribution polymer, including a bimodal molecular weight distribution product, or to obtain a small quantity of a high comonomer containing polymer intimately mixed within a matrix of a low comonomer content polymer, thereby forming desirable blends of polymers merely through altering the cocatalyst or cocatalyst mixture employed in the reaction or in separate reactors used in the polymerization. A preferred secondary cocatalyst employed for this purpose is triethylaluminum, employed in quantities based on titanium in the procatalyst from 1:1 to 1000:1, preferably from 10:1 to 100:1.

High Throughput Method

In one embodiment of the invention, mixtures of starting components (such as procatalyst compounds, cocatalyst candidates, polymerization modifiers, monomers, solvents, etc.) are combined in different ratios, orders, or methods. The polymerizations are performed under varying conditions to create a product library or array. In this embodiment the conditions of the polymerization process are variables that may be combinatorialized. Suitable process conditions that may be combinatorialized include amounts and ratios of starting components, repetitions of process steps, purification (washing) and recovery of catalyst compositions, time allowed for catalyst formation, catalyst formation reaction temperature and pressure, rate of starting component addition to the reaction, residence time (or product removal rate), polymerization temperature, pressure and reaction atmosphere, mixing rate, and other conditions that those of skill in the art will recognize.

In addition, the foregoing embodiments can be combined together. For example, this invention may be practiced by having diversity in the starting components used; by having diversity in the reaction conditions used to form the catalyst library (such as time, temperature, mixing speed, or other conditions used in catalyst formation); by diversity in the polymerization conditions used; or by a combination of all the foregoing variables. The catalyst library is screened by measurement of catalyst productivity such as heat released or mass of polymer generated, or more preferably, consumption of one or more monomers. The polymer library is screened to determine if a polymer of interest has been created using conventional analysis techniques or one of many different rapid polymer characterization techniques.

For example, percent xylene solubles in polypropylene may be measured by use of ASTM method D 5492-98 or equivalent technique. This method determines the fraction of a polypropylene sample that is soluble in o-xylene at 25° C. The soluble fraction has a good correlation to the quantity of the polymer that is amorphous. However, the ASTM method uses gravimetric analysis and requires approximately 2 g of sample and nearly 4 hours to complete. An alternate technique uses trichlorobenzene (TCB) at elevated temperatures (up to 150° C.) to treat the sample, smaller sample size (less than 50 mg), and is amenable to rapid IR absorption or refractive index analysis to quantify solubles content. The technique is an equally reliable indicator of amorphous polymer content as the xylene method. Moreover, the percent TCB solubles test may be automated through use of robotic manipulation, parallel filtration, and fast serial analysis to achieve rapid polymer screening, and may be linked to other rapid testing which also uses TCB as solvent, such as Gel Permeation Chromatography.

The embodiments of this methodology may be combined into a flexible system that includes a number of different stations including one or more stations for combining starting materials, daughtering the libraries, performing the reactions of interest, and screening the results of the process. The system includes a control system that controls, monitors and directs the activities of the system so that a user may design an entire series of experiments by inputting library design, screening, or data manipulation criteria.

Those of skill in the art will appreciate the variety of methods for creating diversity in the libraries of this invention. The screens are employed to determine if the diversity has produced a product or process of interest by directly measuring process parameters, thereby providing a quantifying means for evaluating the individual members of the library.

In particular, this invention provides the method and apparatus for the synthesis of libraries of metal compounds, complexes, or mixtures by a variety of routes for evaluation as catalyst components. Additional components for the catalyst composition may be ordered as libraries or included as a constant or standardized reagent. Optional activation of those compounds, complexes or mixtures into activated catalyst libraries may be included as well, particularly when the activator is one of the variables to be studied or screened. After the precursor, procatalyst, catalyst, cocatalyst, and/or catalyst modifier libraries are prepared, the invention provides for screening of one or more thereof. Screening may be in, for example, a series of individual polymerization reactors that provides detailed information about catalytic activity and kinetics under a variety of reaction options and conditions, including monomer and comonomer choice, solvent, pressure, temperature, stirring rate, volume, stoichiometric relationships, and order of addition of chemicals. Thus, one may chose to "combinatorialize" any of the polymerization reaction conditions for a single or for multiple libraries. By this is meant that individual members of the various libraries are combined and optionally subjected to one or more process steps to ultimately form a catalyst composition which is tested for olefin polymerization properties, polymer properties or other catalyst performance properties. "Combinatorialization" of polymerization conditions can be used to screen for optimal process conditions. Optional steps in this addition polymerization combinatorial process include a primary screen prior to screening in the individual polymerization reactors. A primary screen may, for example, comprise an optical screen under polymerization conditions that simply determines which members of the catalyst library have any activity. Another optional step is to further characterize the resultant polymers formed in the polymerization reactor. Such further screening may employ a rapid liquid chromatography and/or light scattering system, or determine the chemical, physical or mechanical properties of the resultant polymers.

In all of the foregoing examples it is desirable to apply statistical evaluation tools to refine data generated by the individual polymerizations or other reactions. In this manner, unreliable or defective results can be eliminated and actual trends in the data more readily identified. Desirably, data meeting statistically significant requirements, especially data satisfying a 95 percent or greater confidence interval is used in the present invention. Often, in order to evaluate multiple candidates under slightly different polymerization conditions it is additionally necessary to calculate conversion values under standard reaction conditions based on a theoretical polymerization model. Selection of the desired process or product parameter may therefore be based on calculated rather than actual results.

The members of a precursor library, procatalyst library, polymerization modifier library, cocatalyst library, or product library are typically stored or provided in a spatially addressable format, meaning that each compound or mixture is separated from the others, in a liquid or solid form, preferably in a liquid form such as a solution or slurry, and retained in a sealed vial. Due to the reactivity or affinity of many of the components, reagents or solvents employed in forming the various libraries with air or moisture, the individual vials, all reaction vessels, and even the entire combinatorial apparatus are preferably retained under inert atmospheric conditions.

One option for the creation of the procatalyst library may include the generation of stock solutions of the precursor, procatalyst or catalyst library, so that each member of the library is made of the same parent library members by means of different reactions or under different reaction conditions or by combination with different catalyst activators or modifiers. In a preferred embodiment, the procatalyst library, polymerization modifier library, catalyst library, catalyst activator library, or precursors thereof are provided in a liquid form, for example with each compound stored in a separate vessel, preferably in dilute form or as a slurry in a liquid such as a hydrocarbon, halocarbon or halohydrocarbon. Preferably, the compounds or mixtures comprising the parent library are stored in vials having a septum or other sealing mechanism that can be penetrated by a needle that may be on a robotic arm of known liquid handling robots.

A catalyst library may be formed from various combinations of the other libraries or standards to thereby form an array. In a preferred embodiment, at least one member from the precursor library or procatalyst library is combined with at least one cocatalyst. Highly desirably the libraries are combined and reaction conditions varied so as to form at least 10, preferably at least 25, more preferably at least 30, and most preferably at least 50 catalyst library members or polymerization process members of the resulting array.

In some embodiments, the various compounds may be combined without determination of the product of such combination, or if, in fact, a product forms at all. The precursor, procatalyst, catalyst, cocatalyst, or polymerization modifier compound may be added to the reaction vessel at the same time or sequentially. They may be added before or along with any additional reactants used in the reaction of interest. Alternatively, some or all of the compounds may be prereacted or combined and recovered or purified prior to use in a subsequent process. As such, the result of the combination need not be determined.

The product library (procatalyst, cocatalyst, catalyst, polymerization modifier, or polymer) has different members resulting from combinatorializing the process variables in the reaction of interest. Process variables that may be combinatorialized include the types, amounts, and ratios of starting components, time for reaction, reaction temperature, reaction pressure, rate and/or method of starting component addition to the reaction (or reactor), residence time (i.e., rate and/or method of product removal from the reaction or reactor), reaction stir rate and/or method, reaction kill rate and/or method, reaction atmosphere, and other conditions that those of skill in the art will recognize.

Therefore, those of skill in the art will appreciate the vast number of different possible combinations of precursors, modifiers, activators, or other starting components may be combined together to form the catalyst libraries. In addition, this combination methodology may be combined with combinations of various reaction conditions, including different starting component ratios, different temperatures, solvents, monomers, pressures, mixing rates, times, order of addition of chemicals or atmospheres to form vastly different product libraries.

In the methodology of this invention, a library is screened for a property or compound of interest. The screening takes place as the reaction of interest is being performed, that is, in real time. As used herein, "screening" refers to testing a library for a desired property by measurement of one or more product or process variables, preferably one or more process variables under addition polymerization conditions. A screen of one or more process variables may be combined with the evaluation of product properties of interest, if desired. For example, polymerization reactions performed in a polymerization reactor, especially a solution polymerization reactor, can be evaluated by monomer consumption, temperature evolution, and/or pressure-, viscosity-, particle size-, or color-change, and these results individually or collectively correlated with catalyst performance or one or more polymer properties. Examples of suitable polymer properties that may be so correlated with the on-line process data include molecular weight, molecular weight distribution, comonomer content, crystallinity, melting point, melt index, tacticity, solubility, density, etc. However, due to the fact that such product properties are only ascertainable after completion of the polymerization and are subject to possible variability due to any ensuing time delay and change in environment, the use of process variables as the primary screen results in a preferred and highly reliable method for analysis in combinatorial addition polymerization research.

Each of the three types of libraries may be stored in a liquid or solid state and retrieved from storage for combining, daughtering, running in the reaction of interest, screening, or combinations thereof. Libraries are preferably stored in a storage rack that holds the libraries separately from each other. Libraries may be retrieved from storage either manually or automatically, using known automated robots. Specific robots useful for retrieving such stored libraries include systems such as those marketed by Aurora Biosciences or other known robotic vendors. If the libraries are stored in the solid phase, the members typically require dissolution or slurrying, which may be performed at a dissolution or slurrying station, or if sufficient volume is provided for library storage, in the vessel or chamber holding the sample. A dilution station is a location where the library members are dissolved in a suitable solvent and then further transported for use in either the reaction of interest or in a screen. Alternatively, solid materials can be manipulated using a robotic solid dosing unit.

Each precursor, procatalyst, polymerization modifier, cocatalyst, or catalyst libraries may be converted into one or more daughter libraries through formation of arrays. A daughter library is created from the parent library by taking one or more aliquots from one or more members in the parent library, and optionally treated to differing conditions than the parent library or otherwise converted, to form a second library. A limited number of members of the parent library may be daughtered in this manner, or all the members may be daughtered at least once to create a daughter library. Thus, a daughter library may be smaller or larger than the parent library in terms of both the number of members and the sample size. Daughtering is performed in order to provide multiple libraries for multiple reactions of interest or multiple screens without having to recreate the parent library.

In one embodiment, a filtration device is externally mounted and inserted into each cell for purposes of performing a desired separation and thereafter removed or disengaged from the cell upon completion of the separation. Alternatively a filtering station may be provided where each cell or the contents thereof are transferred for further treatment. The filtering station is useful to filter off solid phase agents or products from liquid products or precursors. Desirably, the filtering station can be used multiple times by restoring original process conditions after each filtration.

Filtration provides for ease in the synthesis of the procatalyst, cocatalyst and catalyst libraries. The precursors, procatalysts, cocatalysts and/or components thereof may be provided in the solid phase in a single reactor, while various reagents, solvents and catalyst modifiers are combined and excess reagents or by-products removed. This technique generally allows for the use of an excess of any reagent or solvent, ease of purification or work-up, and automation of the process.

Suitable techniques for screening useful compositions herein include infrared (IR) thermography or Fourier Transform Infrared (FTIR) spectroscopy or visible light or other optical viewing as disclosed in WO 98/15815 or WO 98/15805. Using an optical technique typically entails inserting the starting materials (e.g., library member with reactants or monomer) in an array format into a chamber (for example, a vacuum chamber or a chamber pressurized with reactant monomer or a chamber pressurized with an inert gas). The reaction of interest is performed in parallel in the chamber using a plate having multiple wells for the catalyst members or starting materials for the product members (such as a microtiter plate, for example). The chamber has a window allowing access to the optical camera (e.g., calcium fluoride or sapphire crystal for an IR camera). As the reaction of interest is carried out, the reaction is monitored. For example, an IR camera or thermocouple may record heat released by the reaction. A preferred method for monitoring a process conditions is the measure of monomer consumption, typically by measuring flow of one or more monomers into an otherwise sealed reactor or the pressure decrease with time within a sealed reactor operating under polymerization conditions.

Additional suitable reactors are those that include the ability to combinatorialize certain process variables, such as temperature, time, feed rate, mixing rate, etc. Of course, the reactants, catalysts, initiators, or polymerization modifiers can also be modified or combined in different amounts in addition to or instead thereof, as previously disclosed. Other techniques for screening the various libraries herein may be known or developed by those of skill in the art for specific reactions of interest. Any of the foregoing screens may be used as a primary screen, which serves to quickly eliminate some of the members a libraries or daughter catalyst library, thereby eliminating the need for further, more detailed testing.

Because of the wide applicability of this invention to a broad variety of polymerization conditions, a combinatorial approach can be used to identify optimum precursors, procatalysts, cocatalysts, and catalyst compositions for use in addition polymerization reactions. An advantage to the present combinatorial approach is that the choice of precursor, procatalyst, cocatalyst, polymerization modifier, and catalyst composition can be tailored to specific polymerization conditions.

The scale of the polymerizations employed in the present screening operations preferably employs precursors, procatalyst or catalyst compositions in an amount from 0.01 μg to 1.0 g, more preferably between one 0.1 μg to 0.1 g, although the scale can be modified as desired depending on the equipment used. Those of skill in the art can readily determine appropriate sets of reactions and reaction conditions to generate and/or evaluate the libraries of interest.

The members of the various libraries can be laid out in a logical or a random fashion in multi-tube arrays or multi-well plates, preferably in the form of an array. Preferably, the liquids are dilute solutions or slurries of the compound or mixture of interest. In a preferred embodiment, an A×B array is prepared, with various combinations of precursor, procatalyst, cocatalyst or catalyst of interest. However, it is also possible to evaluate a single procatalyst with a plurality of cocatalysts, optionally with different polymerization temperatures, concentrations, pressures, monomers, or other reaction conditions, and then, optionally, to repeat the process as desired with a plurality of different subject compounds.

The performance of the particular combination of library member, reagent, or process condition under the reaction conditions of interest is measured and correlated to the specific combination tested. Adjustments to the data to compensate for non-standard conditions, systematic variation, or other variable can be applied. In addition, statistical analyses may be performed to manipulate the raw data and determine the presence of unexplainable data variation. The array can be ordered in such a fashion as to expedite synthesis and/or evaluation, to maximize the informational content obtained from the testing, to facilitate the rapid evaluation of such data, or to minimize data variation, if desired. Methods for organizing libraries of compounds are well known to those of skill in the art, and are described, for example, in U.S. Pat. No. 5,712,171. Such methods can be readily adapted for use with the compounds and process parameters described herein.

By screening multiple synthetic variations of a procatalyst, polymerization modifier, cocatalyst, or catalyst composition, the selection of the optimal candidate is rapidly determined. The desired physical and chemical properties for the various library- or daughter library-members can be rapidly optimized, and directly correlated with the chemical or physical changes within a particular array or sub-array.

The polymerizations using the various members in the libraries generally involve contacting appropriate mixtures thereof under polymerization conditions in the tubes or wells in a multi-tube rack or multi-well plate, and allowing the addition polymerization reaction to take place while monitoring one or more process variables, especially heat evolution or monomer consumption. Because of the ease and accuracy of monitoring gaseous flow, ethylene consumption in the polymerization of interest, optionally correlated with heat evolution, is the most desired process variable for screening herein. Secondary screening of polymer properties, especially tacticity, comonomer content, molecular weight, or molecular weight distribution are further optionally correlated with the process data according to the present invention.

Robotic arms and multi-pipette devices are commonly used to add appropriate reagents to the appropriate polymerization reactors, such as the tubes in multi-tube racks, or wells in multi-well plates. Alternatively, but less desirably, a common polymerization reactor can be employed sequentially to conduct the subject polymerizations. The tubes are desirably covered with a rubber septum or similar cover to avoid contamination, and the reagents added via injection through a needle inserted through the cover. Suitable process equipment for the foregoing operations has been previously disclosed in U.S. Pat. Nos. 6,030,917, 6,248,540 and EP-A-978,499.

In one embodiment, the polymerizations are carried out via computer control. The identity of each of the compounds of the library can be stored in a computer in a "memory map" or other means for correlating the data regarding the polymerizations. Alternatively, the chemistry can be performed manually, preferably in multi-tube racks or multi-well plates, and the information stored, for example on a computer.

The invention preferably includes a computer system capable of storing information regarding the identity of the compounds and mixtures in the libraries and the product streams obtained from the polymerizations. Software for managing the data is stored on the computer. Relational database software can be used to correlate the identity of the compounds employed in each polymerization and the results. Numerous commercially available relational database software programs for this purpose are available and known to the skilled artisan. Although relational database software is a preferred type of software for managing the data obtained during the processes described herein, any software that is able to create a "memory map" of the test compounds and correlate that information with the information obtained from the polymerizations can be used.

Any type of multi-well plate or multi-tube array commonly used in combinatorial chemistry can be used. Preferably, the number of wells or tubes is in excess of 30, and there is a tube in at least 60 percent of the positions in each multi-tube array. The shape of the rack is not important, but preferably, the rack is square or rectangular. The tubes can be made, for example, from plastic, glass, or an inert metal such as stainless steel. Because of the relatively high temperatures employed in the synthesis of Ziegler-Natta catalyst compositions, desirably in excess of 80° C., more preferably in excess of 90° C., glass or metal, preferably stainless steel reactors are preferably employed.

Any type of liquid handler that can add reagents to, or remove reagents from, the wells and/or tubes can be used. Many involve the use of robotic arms and robotic devices. Suitable devices are well known to those of skill in the art of combinatorial chemistry. The individual cells are also desirably equipped with or accessible by a filter means through which liquid reagents, products or by-products can be removed, leaving solid products or reagents in the cell. Isolation of polymer products can be accomplished using commercially available centrifugal devolatilizers or evaporators, and needn't be part of the automated procedures of the process.

Any device that can take samples from the polymerization reactor(s) and analyze the contents can be used for product screening. Examples include chromatographic devices, such as an analytical or preparative scale high performance liquid chromatography (HPLC), GC or column chromatography. For analysis of polymer properties simple solution viscosity, melt viscosity, $^1$H NMR, $^{13}$C NMR, FTIR, xylene solubility (XS) studies, or other common analytical techniques may be employed for determination of polymer properties.

Preferably, in those embodiments in which a chromatographic column (HPLC, GC or column chromatography) is used, the device has the ability to identify when the compound of interest is eluting from the column. Various means have commonly been used to identify when compounds of interest are eluting from a column, including ultraviolet (UV), infrared (IR), thin layer chromatography (TLC), gas chromatography-mass spectrometry (GC-MS), flame ionization detector (FID), nuclear magnetic resonance (NMR), evaporative light scattering detector (ELSD), and nitrogen detection. Any of these means, and others known to those of skill in the art, can be used, alone or in combination.

The following specific embodiments of the invention are especially desirable and hereby delineated in order to provide specific disclosure for the appended claims:

1. A method for identifying a catalyst composition for use in the heterogeneous Ziegler-Natta addition polymerization of an olefin monomer, said catalyst composition comprising a procatalyst comprising a magnesium and titanium containing procatalyst and a cocatalyst, said method comprising:

A) providing a library comprising at least one procatalyst compound,

B) forming a catalyst composition library by contacting the members of said procatalyst library with one or more cocatalysts and contacting the resulting mixture with an olefin monomer under olefin polymerization conditions thereby causing a polymerization reaction to take place, C) measuring at least one variable of interest during the polymerization, and D) selecting the catalyst composition of interest by reference to said measured variable.

2. The method of embodiment 1, wherein the cocatalyst is formed by a process requiring at least one intermediate step or the cocatalyst is formed by reaction of two or more reagents.

3. The method of embodiment 2, wherein the property of interest is catalytic activity.

4. The method of embodiment 2, wherein the cocatalyst is formed by reaction of one or more compounds of the formula: $[M^4A^1_{x'}G_{y'}]_{z'}$, wherein:

$M^4$ is a metal of Groups 2-13, Ge, Sn, or Bi;

$A^1$ is independently an anionic or polyanionic ligand;

x' is a number greater than zero and less than or equal to 6;

G is a neutral Lewis base, optionally bound to $A^1$;

y' is a number from 0-4;

z' is a number from 1 to 10;

With one or more compounds of the formula: $[(H-J^1)_{z''}A^2]_{z'''}$, wherein:

$J^1$ is $NA^3$, $PA^3$, S, or O, z" is 1 or 2, $A^2$ is $C_{1-20}$ hydrocarbyl or inertly substituted hydrocarbyl, tri($C_{1-10}$hydrocarbyl)silyl, or a polyvalent derivative thereof, $A^3$ is hydrogen, $C_{1-20}$ hydrocarbyl or inertly substituted hydrocarbyl, or a covalent bond (when $A^2$ is a divalent ligand group and z" is one); and z''' is a number from 1 to 10.

5. The method of embodiment 1, wherein all of the process steps are conducted in the same reactor vessel by means of computer controlled, robotic processing and the screening results are stored in at least one memory device.

6. The method of embodiment 1, wherein the library is used to form the A axis of an A×B array and a second selection of compositions or process conditions is used to form the B axis of said A×B array and relational database software is used to select the property of interest from among the set of binary pairs of said A×B array.

7. The method of embodiment 1, further comprising measurement of at least one resulting polymer property.

8. The method of embodiment 1 wherein the process variable that is measured is the quantity of at least one monomer consumed during the polymerization.

9. A process for the polymerization of an olefin by contacting a polymerizable mixture comprising at least one olefin monomer under Ziegler-Natta polymerization conditions with a catalyst composition comprising a magnesium and titanium containing procatalyst and a cocatalyst, characterized in that the cocatalyst comprises a compound selected from the group consisting of (t-butyldimethylsiloxy)di(i-butyl)aluminum, (t-butyldimethylsiloxy)di(n-octyl)aluminum, pentafluorophenoxydi(isobutyl)aluminum, pentafluorophenoxydi(n-octyl)aluminum, phenoxydi(i-butyl)aluminum, (3,5-dimethyl-2,4-pyrazol-1-yl)di(ethyl)aluminum, (3,5-dimethyl-2,4-pyrazol-1-yl)di(n-octyl)aluminum, and dodecyloxydi(n-octyl)aluminum or the mixture formed by reaction of approximately equal molar quantities of t-butyldi(methyl)hydroxysilane with tri(isobutyl)aluminum or tri(n-octyl)aluminum, pentafluorophenol with tri(isobutyl) aluminum or tri(n-octyl)aluminum, phenol with tri(isobutyl) aluminum, 3,5-dimethyl-1,4-pyrazole with triethylalumium or tri(n-octyl)aluminum, or dodecanol with tri(n-octyl)aluminum.

10. A process according to embodiment 9 wherein the procatalyst comprises the reaction product of magnesium dichloride, an alkylaluminum dihalide, and a titanium alkoxide.

11. A process according to embodiment 9 wherein ethylene and 1-octene are copolymerized.

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled.

EXAMPLES

It is understood that the present invention is operable in the absence of any component which has not been specifically disclosed. The following examples are provided in order to further illustrate the invention and are not to be construed as limiting. Unless stated to the contrary, all parts and percentages are expressed on a weight basis. The term "overnight", if used, refers to a time of approximately 16-18 hours, "room temperature", if used, refers to a temperature of about 20-25° C., and "mixed alkanes" refers to a mixture of hydrogenated propylene oligomers, mostly $C_6$-$C_{12}$ isoalkanes, available commercially under the trademark Isopar E™ from Exxon-Mobil Chemicals, Inc. In the event a discrepancy between a compound name and its structure should occur, the structure shall be controlling.

Example 1

All glassware is dried at 110° C. for a minimum of two hours prior to transferring to a dry box. All reagents and solvents are purified and dried prior to use using published techniques. All preparations were performed in a Nexus™ brand drybox (available from Vacuum Atmospheres Corporation). All work is performed under inert atmosphere using a Chemspeed™ Automated Synthesis Workstation model ASW1000 (available from Chemspeed, Inc.).

An array of 16 individual reactor vessels (cells) each having 8 ml working volume is used to prepare and evaluate a cocatalyst library. Each cell is was equipped with a reflux condenser having integrated therein a fritted filter stick. The procatalyst employed is a $MgCl_2$ supported titanium composition prepared essentially according to the teachings of U.S. Pat. No. 5,844,045, Example 1 by reaction of a magnesium dichloride dispersion in mixed alkanes, first with a hexane solution of ethyldichloroalumlinum in approximately a 1:4 molar ratio and then with a solution of titanium tetraisopropoxide in mixed alkanes to give a composition having a molar ratio, Mg/Al/Ti, of approximately 40/13/3.

The cocatalysts are synthesized in situ by combination in a 1:1 molar ratio of a Lewis acid (A) and an organic protonating reagent (B), some of which are further identified in Table 1. All syntheses are performed in mixed alkanes solvent with stirring for one hour at room temperature. The reaction mixture is used without isolation or purification. A total of 94 cocatalyst candidates are tested. Identities of certain of the reagents used and their reaction products (cocatalysts) are further identified in Table 1.

TABLE 1

| | A1 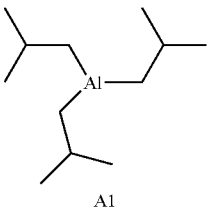 | A2 Al(Et)$_3$ | A3 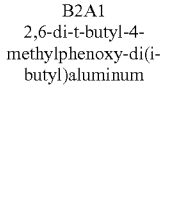 |
|---|---|---|---|
| B1 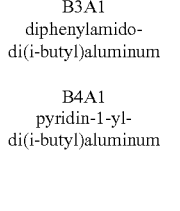 | B1A1 2,6-diphenylphenoxydi(i-butyl)aluminum | B1A2 2,6-diphenylphenoxy-di(ethyl)aluminum | B1A3 2,6-diphenylphenoxy-di(octyl)aluminum |
| B2  | B2A1 2,6-di-t-butyl-4-methylphenoxy-di(i-butyl)aluminum | B2A2 2,6-di-t-butyl-4-methylphenoxy di(ethyl)aluminum | B2A3 2,6-di-t-butyl-4-methylphenoxy di(octyl)aluminum |
| Ph$_2$NH, B3 | B3A1 diphenylamido-di(i-butyl)aluminum | B3A2 diphenylamido-di(ethyl)aluminum | B3A3 diphenylamido-di(octyl)aluminum |
| B4 | B4A1 pyridin-1-yl-di(i-butyl)aluminum | B4A2 pyridin-1-yl-di(ethyl)aluminum | B4A3 pyridin-1-yl-di(ethyl)aluminum |

TABLE 1-continued

| | | | |
|---|---|---|---|
| | 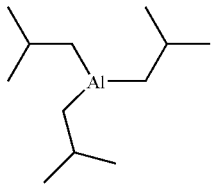 | Al(Et)$_3$ | 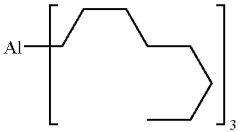 |
| | A1 | A2 | A3 |
| 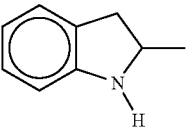 B5 | B5A1<br>2-methyl-4,5-benzo-pyrrolidin-1-yl-di(i-butyl)aluminum | B5A2<br>2-methyl-4,5-benzo-pyrrolidin-1-yl-di(ethyl)aluminum | B5A3<br>2-methyl-4,5-benzo-pyrrolidin-1-yl-di(octyl)aluminum |
| (benzyl)$_2$NH B6 | B6A1<br>dibenzylamido-di(i-butyl)aluminum | B6A2<br>dibenzylamido-di(ethyl)aluminum | B6A3<br>dibenzylamido-di(ethyl)aluminum |
| (i-Pr)$_2$NH B7 | B7A1<br>di(i-propyl)amido-di(i-butyl)aluminum | B7A2<br>di(ethyl)amido-di(i-butyl)aluminum | B7A3<br>di(octyl)amido-di(i-butyl)aluminum |
| (Me$_3$Si)$_2$NH B8 | B8A1<br>bis(trimethylsilyl)amido-di(i-butyl)aluminum | B8A2<br>bis(trimethylsilyl)amido-di(ethyl)aluminum | B8A3<br>bis(trimethylsilyl)amido-di(octyl)aluminum |
| Ph—OH B9 | B9A1<br>phenoxydi(i-butyl)-aluminum | B9A2<br>phenoxydi(ethyl)-aluminum | B9A3<br>phenoxydi(i-butyl)-aluminum |
| F$_5$C$_6$OH B10 | B10A1<br>pentafluorophenoxy-di(i-butyl)aluminum | B10A2<br>pentafluorophenoxy-di(ethyl)aluminum | B10A3<br>pentafluorophenoxy-di(octyl)-aluminum |
| 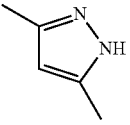 B11 | B11A1<br>3,5-dimethyl-2,4-pyrazol-1-yl(di(i-butyl)aluminum | B11A2<br>3,5-dimethyl-2,4-pyrazol-1-yl(di(ethyl)aluminum | B11A3<br>3,5-dimethyl-2,4-pyrazol-1-yl(di(octyl)aluminum |
| 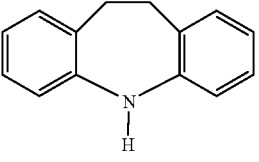 B12 | B12A1<br>1H-dibenzopine-4,5-dihydro-1-yl-di(i-butyl)aluminum | B12A2<br>1H-dibenzopine-4,5-dihydro-1-yl-di(ethyl)aluminum | B12A3<br>1H-dibenzopine-4,5-dihydro-1-yl-di(octyl)aluminum |
| 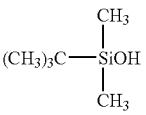 B13 | B13A1<br>(t-butyl)dimethylsiloxy-di(i-butyl)aluminum | B13A2<br>(t-butyl)dimethylsiloxy-di(ethyl)aluminum | B13A3<br>(t-butyl)dimethylsiloxy-di(octyl)aluminum |
| 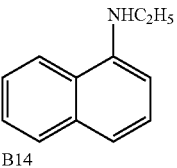 B14 | B14A1<br>(ethyl)(napthyl)amido-di(i-butyl)aluminum | B14A2<br>(ethyl)(napthyl)amido-di(ethyl)aluminum | B14A3<br>(ethyl)(napthyl)amido-di(octyl)aluminum |
| C$_6$H$_5$NHCH$_2$C$_6$H$_5$ B15 | B15A1<br>phenylbenzylamido-di(i-butyl)aluminum | B15A2<br>phenylbenzylamido-di(ethyl)aluminum | B15A3<br>phenylbenzylamido-di(octyl)aluminum |

TABLE 1-continued

| | 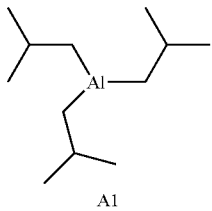 A1 | Al(Et)$_3$ A2 |  A3 |
|---|---|---|---|
| 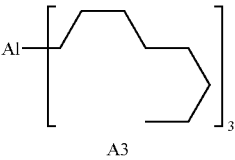 B16 NHC$_6$H$_5$ | B16A1 (ethyl)(napthyl)amido-di(i-butyl)aluminum | B16A2 (phenyl)(napthyl)amido-di(ethyl)aluminum | B16A3 (phenyl)(napthyl)amido-di(octyl)aluminum |
| dodecanol B17 | B17A1 dodecyloxy-di(i-butyl)aluminum | B17A2 dodecyloxy-di(ethyl)aluminum | B17A3 dodecyloxy-di(octyl)aluminum |

Ethylene/1-Octene Copolymerization

In a drybox under a nitrogen atmosphere with oxygen and water content below 1 ppm, 50 nanomoles of procatalyst (slurried in mixed alkanes solvent) is transferred to a mixing cell along with 5 ml of mixed alkanes; and the cocatalyst composition to be tested in a molar ratio based on titanium of 70:1. The resulting catalyst slurry is stirred at room temperature for one hour prior to use. The reactors of a multiple cell parallel pressurized reactor (PPR) are charged with 250 μl of 1-octene, pressurized with H$_2$ at 10 psig (200 kPa) followed by ethylene gas at 150 psig (1.1 MPa) and brought to temperature (165° C.). The catalyst slurries are then injected into each cell. The polymerization reaction is allowed to continue for 15 minutes, at which time the reaction is terminated by flooding the cell with CO$_2$ gas. Several control runs using triethylaluminum cocatalyst in a molar ratio based on titanium of 50:1 are conducted periodically as well (giving an average yield of 0.1098 g of polymer). After completion of the entire array, the cells are removed from the reactors, the solvent removed and the polymer recovered. Yield of polymer is determined by increase in cell weight. Productivity results determined as kg polymer/g procatalyst hour relative to the control average, polymer Mw, and comonomer content for selected catalyst compositions are shown in Table 2. Only cocatalysts producing activities, molecular weights or comonomer incorporations greater than those of the control are listed. The average Mw for the control polymerizations is 0.65×10$^6$. The average comonomer incorporation for the control polymerizations is 2.03 percent.

TABLE 2

Selected Polymerization Results

| | Activity | | | Mw × 10$^6$ | | | Percent Octene | | |
|---|---|---|---|---|---|---|---|---|---|
| | A1 | A2 | A3 | A1 | A2 | A3 | A1 | A2 | A3 |
| B1 | | | | 0.71 | | 0.76 | 4.42 | | |
| B2 | | | | | | | | | |
| B3 | | | | | 0.71 | | 2.19 | | 2.13 |
| B4 | | | | | 0.79 | | | | 4.03 |
| B5 | | | | | | | | | |
| B6 | | | | | 1.33 | | | | 7.60 |
| B7 | | 1.04 | | | 1.35 | | 2.62 | 2.61 | |
| B8 | | | | | 1.12 | | | | 5.00 |
| B9 | | | | | | | | | |
| B10 | 1.21 | | 1.16 | 0.75 | 0.78 | 0.77 | | | 2.40 |
| B11 | | | | 0.91 | 1.02 | 0.81 | 24.91 | | |
| B12 | | | | 0.82 | 0.71 | 0.86 | 2.57 | 2.98 | |
| B13 | | 1.28 | | | | 0.71 | | | |
| B14 | | | | 0.82 | 0.73 | 0.92 | | | 2.23 |
| B15 | | | | | 0.89 | | 5.32 | | |
| B16 | | | | 0.85 | | 0.90 | | | |
| B17 | | | | | | | | | |

As may be seen by reference to Table 2, several cocatalysts gave better activity, higher Mw or greater percent octene incorporation than the control, TEA. The cocatalysts resulting in improved activity were (t-butyl)dimethylsiloxydi(octyl)aluminum, pentafluorophenoxydi(i-butyl)aluminum and pentafluorophenoxydi(octyl)aluminum. Moreover, two cocatalysts, pentafluorophenoxydi(i-butyl)aluminum and pentafluorophenoxydi(octyl)aluminum gave both improved activity and increased Mw compared to the control, while pentafluorophenoxydi(octyl)aluminum gave improved activity, increased Mw, and greater octene incorporation compared to the control.

Example 2

Based on the results from the combinatorial parallel reactor experiments, 30 candidate cocatalysts are selected for evaluation under larger scale, continuous solution polymerization conditions. Synthesis of the aluminum containing compounds is conducted in large scale dilute hydrocarbon solution over several hours reaction time. Three illustrative preparations follow.

Preparation 1-1-3,5-dimethyl-2,4-pyrazol-1-yl-di(i-butyl)aluminum (B11A2)

In the drybox, 290.6 g (3.02 mol, 1.0 equiv) 3,5-dimethylpyrazole (DMP) is weighed into a dry glass flask and removed from the drybox. A solution of 353.8 g triethylaluminum (3.10 mol, 1.025 equiv) in 4.5 L mixed alkanes is prepared and divided into five dry 1-L glass flasks. The flasks are capped with septa and also removed from the box. About 5 L of mixed alkanes are added to a dry $N_2$-sparged 30 L reaction vessel and the DMP is added through a funnel under a sweep of $N_2$. After stirring the slurry for 10 minutes at 22° C. addition of the TEA solution is started via cannula. The TEA solution is added slowly over a 1 hour period, resulting in a modest exotherm. Following the addition, the reaction mixture is stirred for an additional 2 hours. The resulting solution is transferred to a clean dry glass cylinder, giving 7.7 kg solution.

Preparation 2-3,5-dimethyl-2,4-pyrazol-1-yl-di(octyl)aluminum (B11A3)

The reaction conditions of Preparation 1 are substantially repeated excepting that trioctylaluminum is substituted for triethylaluminum.

Preparation 3-(t-butyl)dimethylsiloxy-di(octyl)aluminum (B13A3).

In the drybox, a 50 percent solution of 1136 g tri-n-octylaluminum (TNOAL) (3.10 mol, 1.025 equiv) in 1.6 L mixed alkanes is prepared and divided into four dry 1-L glass flasks. A solution of 400 g t-butyldimethylsilanol (TBDMS) (3.02 mol, 1.0 equiv) in mixed alkanes (total volume 4 L) is prepared and split into four different 1-L glass flasks. About 4 L of mixed alkanes is added to a dry $N_2$-sparged 3 0 L reaction vessel and the TNOAL solution is added via cannula. After stirring for 10 minutes at 23° C. the TBDMS solution is added over 2 hours via cannula, resulting in a modest exotherm. Following the addition, the reaction mixture is stirred for an additional 2 hours. The resulting solution is transferred to a clean dry cylinder, giving 6.7 kg of solution.

Continuous Solution Polymerization

Purified mixed alkanes solvent, ethylene, hydrogen, and 1-octene are supplied to a 1 gallon (3.8 L) reactor equipped with a jacket for temperature control and an internal thermocouple. The 1-octene is mixed with the solvent stream before addition to the reactor. The catalyst component solutions are metered using pumps and mass flow meters, and are combined with the catalyst flush solvent. This stream enters the bottom of the reactor through a separate port from the monomer stream. The reactor is run liquid full at 450 psig (3.2 MPa) with vigorous stirring. A product stream is continuously removed from the top of the reactor while fresh reagents and solvent are charged to the bottom. Hydrogen is supplied to provide a polymer having a target density of about 0.920. Steady state conditions are reached after approximately 4-8 hours polymerization with an average production rate under steady conversion conditions of about 4 lbs./hr (1.8 kg/hr). A product stream is continuously removed from the reactor and polymer recovered by the addition of a small amount of water, stabilizer and other additives to stop polymerization and devolatilization to remove diluents. The cocatalysts (CC) are all tested at molar ratio based on titanium of 8:1. Selected results and product properties are provided in Table 3.

TABLE 3

| run | CC | T(° C.) | $H_2^1$ | Eff. (g/μg Ti) | $I2^2$ | $I10/I2^2$ | Density (g/cm³) |
|---|---|---|---|---|---|---|---|
| A* | TEA | 192.2 | 11.8 | 0.54 | 1.16 | 9.20 | — |
| 1 | B9A3 | 195.6 | 24.9 | 0.87 | 1.31 | 7.76 | 0.921 |
| 2 | B10A1 | 195.2 | 24.9 | 1.31 | 0.81 | 7.63 | 0.922 |
| 3 | B11A2 | 195.5 | 29.9 | 1.19 | 1.28 | 7.64 | 0.921 |
| 4 | B11A3 | 195.2 | 30.2 | 0.60 | 1.22 | 7.56 | 0.918 |

TABLE 3-continued

| run | CC | T(° C.) | $H_2^1$ | Eff. (g/μg Ti) | $I2^2$ | $I10/I2^2$ | Density (g/cm³) |
|---|---|---|---|---|---|---|---|
| 5 | B13A1 | 194.7 | 15.6 | 0.89 | 1.15 | 8.66 | 0.921 |
| 6 | B13A3 | 194.9 | 19.9 | 0.69 | 1.24 | 8.03 | 0.919 |
| 7 | B17A3 | 195.0 | 14.9 | 0.74 | 0.93 | 8.37 | 0.919 |
| B* | TEA | 194.4 | 10.4 | 0.43 | 1.28 | 8.37 | 0.920 |

*comparative, not an example of the invention (TEA = triethylaluminum)
[1]standard cm³/min
[2]ASTM D-1238, condition 190/2.16 (dg/min)
[3]ASTM D-1238

As may be seen by reference to Table 3, improved efficiency can be obtained compared to the use of TEA cocatalyst with all of the listed compounds, specifically pentafluorophenoxydi(i-butyl)aluminum, phenoxydi(i-butyl)aluminum, (3,5-dimethyl-2,4-pyrazol-1-yl)di-(ethyl)aluminum, (3,5-dimethyl-2,4-pyrazol-1-yl)di-(n-octyl)aluminum, (t-butyldimethylsiloxy)di(i-butyl)aluminum, (t-butyldimethylsiloxy)di(octyl)aluminum, and dodecyloxydi(octyl)aluminum.

The invention claimed is:

1. A method for identifying a catalyst composition comprising the steps of:
   A) providing a library comprising at least one procatalyst compound,
   B) forming a catalyst composition library by contacting the members of said procatalyst library with one or more cocatalysts and contacting the resulting mixture with an olefin monomer under olefin polymerization conditions thereby causing a polymerization reaction to take place,
   C) measuring at least one variable of interest during the polymerization, and
   D) selecting the catalyst composition of interest by reference to said measured variable;
   E) thereby identifying a catalyst composition for use in a heterogeneous Ziegler-Natta addition polymerization of one or more olefin monomers, wherein said catalyst composition comprises at least one said procatalyst comprising magnesium and titanium, and a cocatalyst, wherein said cocatalyst is formed by reaction of a compound of the formula: $[M^4A^1_{x'}G_{y'}]_{z'}$, wherein:
   $M^4$ is a metal selected from the group consisting of B, and Al;
   $A^1$ is independently an anionic or polyanionic ligand;
   x' is a number greater than zero and less than or equal to 6;
   G is a neutral Lewis base, optionally bound to $A^1$;
   y' is a number from 0-4;
   z' is a number from 1 to 10;
   With a compound of the formula: $[(H-J^1)_{z''}A^2]_{z'''}$, wherein:
   $J^1$ is $NA^3$, $PA^3$, S, or O;
   z" is 1 or 2;
   $A^2$ is $C_{1-20}$ hydrocarbyl or inertly substituted hydrocarbyl, tri($C_{1-10}$hydrocarbyl)silyl, or a polyvalent derivative thereof;
   $A^3$ is hydrogen, $C_{1-20}$ hydrocarbyl or inertly substituted hydrocarbyl, or a covalent bond (when $A^2$ is a divalent ligand group and z" is one); and
   z''' is a number from 1 to 10.

2. The method of claim 1, wherein the cocatalyst is formed by a process requiring at least one intermediate step or the cocatalyst is formed by reaction of two or more reagents.

3. The method of claim 2, wherein the property of interest is catalytic activity.

4. The method of claim 1, wherein all of the process steps are conducted in the same reactor vessel by means of computer controlled, robotic processing and the screening results are stored in at least one memory device.

5. The method of claim 1, wherein the library is used to form the A axis of an A×B array and a second selection of compositions or process conditions is used to form the B axis of said A×B array and relational database software is used to select the property of interest from among the set of binary pairs of said A×B array.

6. The method of claim 1, further comprising measurement of at least one resulting polymer property.

7. The method of claim 1 wherein the process variable that is measured is the quantity of at least one monomer consumed during the polymerization.

8. The method of claim 1, wherein said cocatalyst is a alkyl aluminum composition selected from the group consisting of (t-butyldimethylsiloxy)di(i-butyl)aluminum, (t-butyldimethylsiloxy)di(n-octyl)aluminum, pentafluorophenoxydi(isobutyl)aluminum, pentafluorophenoxydi(n-octyl)aluminum, phenoxydi(i-butyl)aluminum, (3,5-dimethyl-2,4-pyrazol-1-yl)di(ethyl)aluminum, (3,5-dimethyl-2,4-pyrazol-1-yl)di(n-octyl)aluminum, and dodecyloxydi(n-octyl)aluminum or the mixture formed by reaction of approximately equal molar quantities of t-butyldi(methyl)hydroxysilane with tri(isobutyl)aluminum or tri(n-octyl)aluminum, pentafluorophenol with tri(isobutyl)aluminum or tri(n-octyl)aluminum, phenol with tri(isobutyl)aluminum, 3,5-dimethyl-1,4-pyrazole with triethylalumium or tri(n-octyl)aluminum, or dodecanol with tri(n-octyl)aluminum.

9. The method of claim 1, wherein the procatalyst comprises the reaction product of magnesium dichloride, alkylaluminum dihalide and titanium alkoxide.

10. The method of claim 1, wherein ethylene and 1-octene are copolymerized.

* * * * *